United States Patent [19]

Obe et al.

[11] Patent Number: 4,650,242
[45] Date of Patent: Mar. 17, 1987

[54] TRACTOR CABIN

[75] Inventors: Mitsuhiko Obe; Isamu Kawai; Masaru Nakata; Katumi Oisi, all of Sakai; Yosaburo Shimizu, Kawachinagano; Katsushi Fukawatase, Sakai; Takao Nishikawa, Sakai; Kenji Hinoue, Sakai; Susumu Arisawa, Kawachinagano; Kenichi Sato, Osaka; Yasunori Kurata; Kengo Sato, both of Sakai, all of Japan

[73] Assignee: Kubuto, Ltd., Osaka, Japan

[21] Appl. No.: 780,490

[22] Filed: Sep. 26, 1985

[30] Foreign Application Priority Data

Nov. 26, 1984 [JP] Japan ................... 59-248883
Nov. 26, 1984 [JP] Japan ................... 59-248884
Jan. 10, 1985 [JP] Japan ................... 60-2104[U]

[51] Int. Cl.⁴ .................................. B62D 33/06
[52] U.S. Cl. ........................... 296/190; 296/200; 180/89.12
[58] Field of Search ............... 296/190, 200; 180/89.12

[56] References Cited

U.S. PATENT DOCUMENTS

| 3,397,008 | 8/1968 | Timmerman | 296/190 |
| 4,099,763 | 7/1978 | Maier et al. | 296/190 |
| 4,135,756 | 1/1979 | Hausmann | 296/190 |
| 4,283,087 | 8/1981 | Kauss et al. | 296/190 |

Primary Examiner—Robert R. Song
Attorney, Agent, or Firm—Jordan and Hamburg

[57] ABSTRACT

A tractor cabin having a pair of right and left front struts, a pair of right and left rear struts, a pair of right and left intermediate struts disposed between the front and rear struts, a top frame interconnecting upper ends of the front, rear and intermediate struts, a floor sheet attached to lower ends of the front, rear and intermediate struts, and a gate-shaped cabin front defined by the front struts and the top frame. The cabin comprises a gate-shaped partition assembly disposed at a lower midposition transversely of the cabin front, connecting members connecting right and left lower ends of the partition assembly to lower ends of the right and left front struts, and a transparent member secured to inner peripheries of the cabin front, the transparent member including side transparent portions extending downwardly therefrom.

6 Claims, 18 Drawing Figures

TRACTOR CABIN

BACKGROUND OF THE INVENTION

This invention relates to a tractor cabin and more particularly to an improvement in an integrated type tractor cabin having a framework and a floor sheet attached to the framework.

A known tractor cabin of the type noted above which houses a driver's section comprises a framework including a pair of right and left front struts, a pair of right and left rear struts, a pair of right and left intermediate struts disposed between the front and rear struts, and a top frame interconnecting upper ends of the front, rear and intermediate struts, and a floor sheet attached to lower ends of the framework.

This integrated type tractor cabin has the advantage that for assembly the cabin may simply be lifted by a crane and placed on a tractor. Such a tractor cabin has a further advantage that its appearance is almost comparable with that of an ordinary passenger car and helps toward the diffusion of tractors.

Unlike an ordinary passager car a tractor is a power vehicle or working vehicle that engages in work at a working site. Therefore, the tractor must provide the driver with a good field of vision and must be rigidly built in order to protect the driver in case the tractor should turn over. Especially the tractor must provide the seated operator with a good forward view and in particular a good view in both right and left lower forward directions.

In the prior art, however, this type of tractor has a cabin front including connecting members extending transversely at a vertically intermediate position by way of emphasis on structural strength. These connecting members are obstructive to the driver's field of vision in the right and left lower forward directions.

Furthermore, it is common practice to arrange a steering wheel, pedals and other elements in the cabin without any consideration to the driver's view and structural strength.

SUMMARY OF THE INVENTION

The object of this invention is to provide a tractor cabin which is satisfactory from the point of view of both good forward field of vision and structural strength and which permits various instruments to be arranged in the cabin with ease.

In order to achieve the above object, this invention provides a tractor cabin having a pair of right and left front struts, a pair of right and left rear struts, a pair of right and left intermediate struts disposed between the front and rear struts, a top frame interconnecting upper ends of the front, rear and intermediate struts, a floor sheet attached to lower ends of the front, rear and intermediate struts, and a gate-shaped cabin front defined by the front struts and the top frame, the cabin comprising a gate-shaped partition assembly disposed at a lower mid-position transversely of the cabin front, connecting members connecting right and left lower ends of the partition assembly to lower ends of the right and left front struts, and a transparent member secured to inner peripheries of the cabin front, the transparent member including side transparent portions extending downwardly therefrom.

According to this invention, the partition assembly disposed at a lower portion of the cabin front is utilized to maintain a steering wheel, brake and clutch pedals and other elements.

The transparent member mounted in the cabin front provides a good forward view for the seated driver. In particular, the side transparent portions thereof permit the driver to observe actions of a working implement attached to the front of the tractor and to ascertain a steering condition. Since the connecting members are disposed at lower ends of the cabin front, the seated driver has an unhindered view in right and left lower forward directions.

As described, the partition assembly is gate-shaped and has lower ends thereof connected to the right and left front struts of the cabin framework. This construction renders the framework strong against an external force acting transversely thereon.

Other advantages of this invention will be apparent from the following description.

BRIEF DESCRIPTION OF THE DRAWINGS

The drawings illustrate tractor cabins embodying this invention, in which.

DESCRIPTION OF THE PREFERRED EMBODIMENTS

Figure 1:
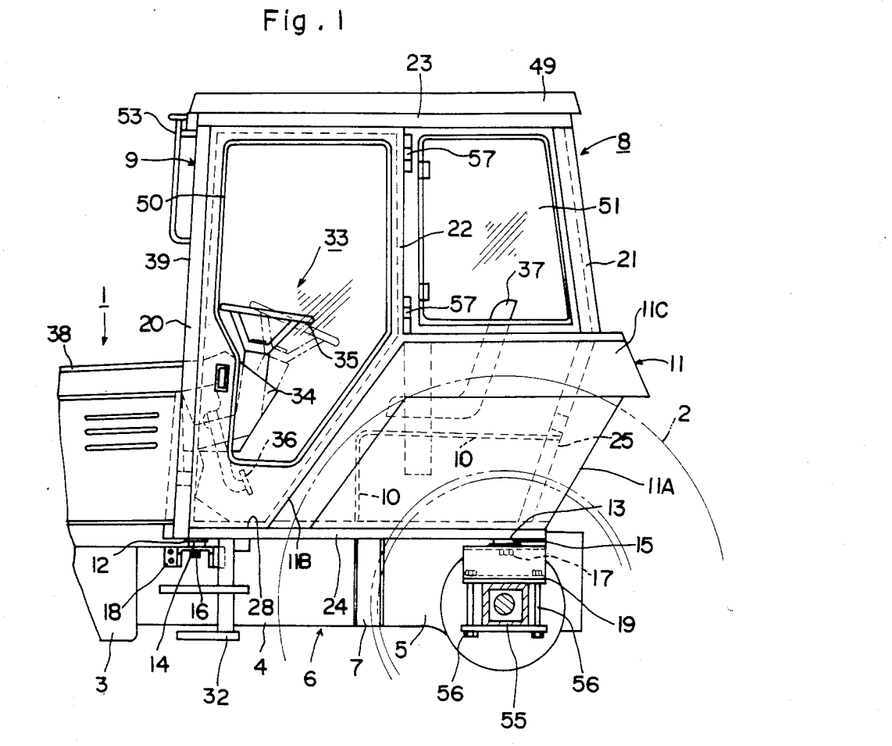
FIG. 1 is a side view of a cabin as mounted on a tractor.
Figure 2:
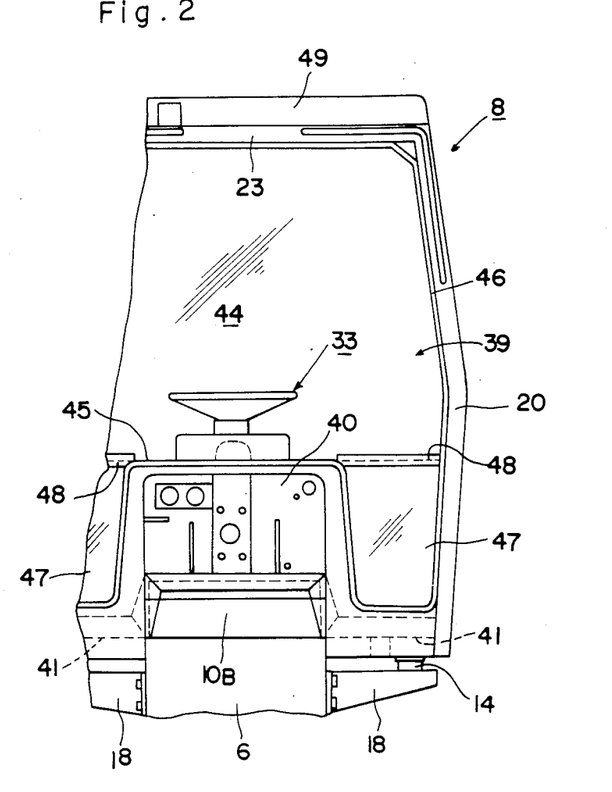
FIG. 2 is a partial front view of the cabin.
Figure 3:
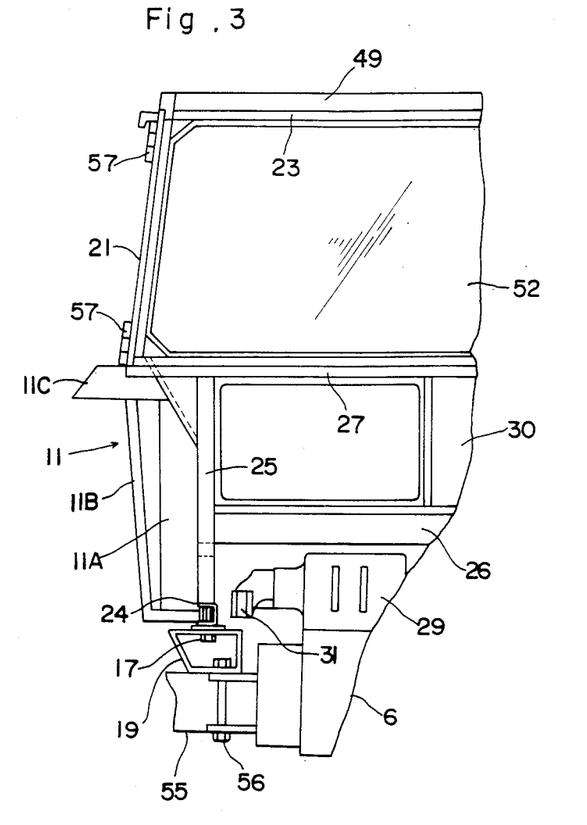
FIG. 3 is a partial rear view of the cabin.

Referring to FIGS. 1 through 3, a two axle, four wheel type tractor 1 is shown with a rear wheel referenced 2. The tractor 1 includes an engine 3, a clutch housing 4 and a transmission case 5 which together constitute a tractor chassis 6.

In the illustrated example an intermediate case 7 is mounted between the clutch housing 4 and the transmission case 5. The tractor has a long wheelbase when the intermediate case 7 is provided and a short wheelbase when the intermediate case 7 is omitted. In either case a cabin 8 may be employed for the tractor, and this aspect will be described later.

The cabin 8 comprises a framework 9, a floor sheet 10 and a pair of right and left wheel fenders 11 rigidly connected to one another. The framework 9 includes mounting seats 12 and 13 at right and left front lower ends and at right and left rear lower ends thereof, respectively, to be secured through vibration stoppers 14 and 15 to brackets 18 and 19 of the chassis by means of bolts 16 and 17.

The framework 9 comprises a pair of right and left front struts 20, a pair of right and left rear struts 21, and intermediate struts 22 disposed between the front struts 20 and the rear struts 21. All these struts 20, 21 and 22 have upper ends flush with one another and interconnected by a top frame 23. Furthermore, base frames 24 are provided to extend rearwardly from lower ends of the right and left front struts 20, and the mounting seats 12 and 13 are disposed substantially at front and rear ends of these base frames 24, respectively.

Figure 4:
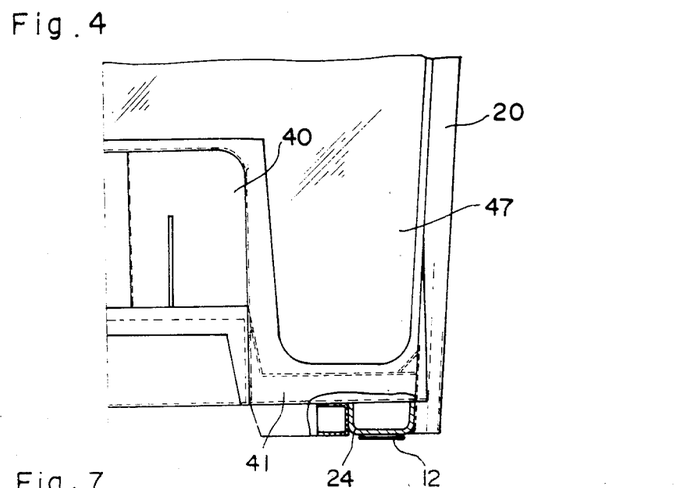
FIG. 4 is a partial frond view of a cabin framework.
Figure 5:
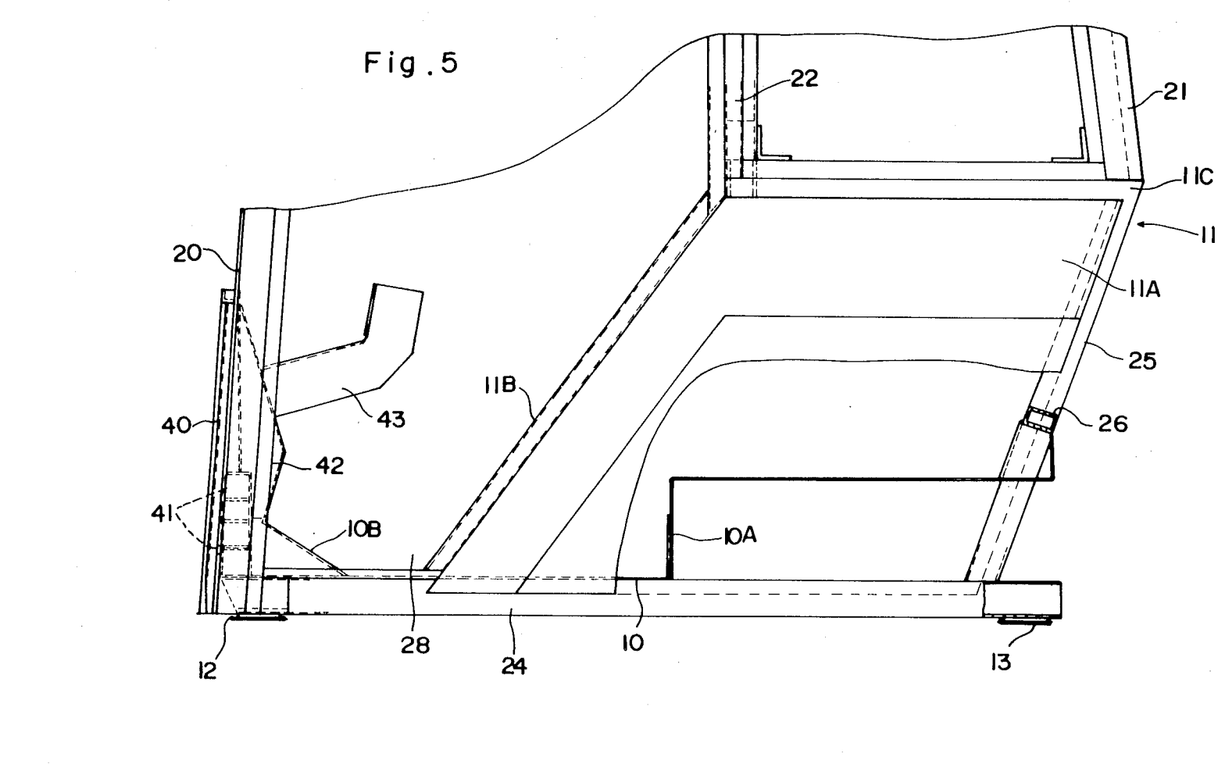
FIG. 5 is a partial side view of the cabin framework.
Figure 6:
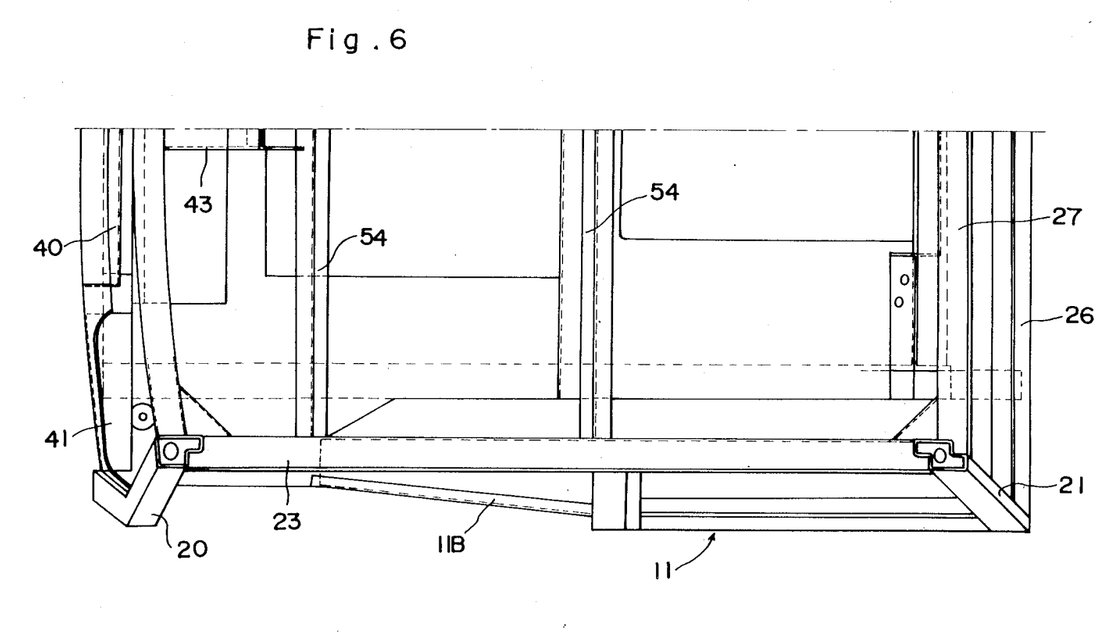
FIG. 6 is a partial plan view of the cabin framework.
Figure 7:
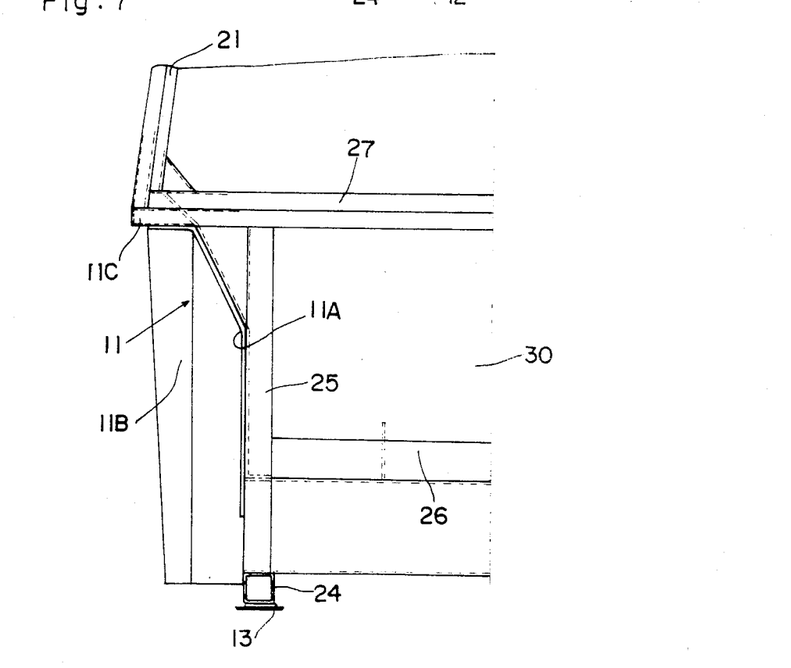
FIG. 7 is a partial rear view of the framework.
Figure 8:
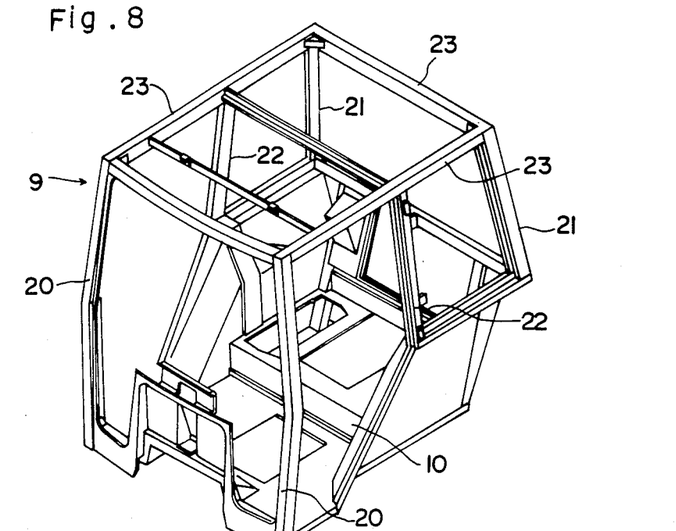
FIG. 8 is a perspective view of the framework.

Referring also to FIGS. 4 through 6, the framework 9 further includes right and left struts 25 extending upward in a rearwardly inclined manner from rear ends of the base frames 24. The struts 25 are interconnected at upper ends and at intermediate positions adjacent to lower ends thereof by cross bars 26 and 27 extending transversely of the cabin. The wheel fenders 11 project laterally outwardly from the struts 25, respectively.

Each of the fenders 11 comprises a vertical portion 11A, a front portion 11B sloping forwardly, and a top portion 11C. A cabin hatch 28 is provided between the front strut 20 and the front portion 11B of the fender.

The floor sheet 10 extends to cover an entire area defined by the base frames 24 and the struts 25, and includes a rising wall portion 10A at a longitudinally intermediate position thereof to cover a hydraulic device 29. A rear end of the floor sheet 10 is connected to the cross bars 26 and 27 to define a mud guard 30 extending upward. Number 31 denotes a pair or right and left lift arms, and number 32 denotes a doorstep.

Number 33 denotes a driver's section provided in the cabin 8, which includes an instrument panel 34, a steering wheel 35, clutch and brake pedals 36, and a driver's seat 37.

Number 38 denotes a bonnet covering the engine 3 and disposed in a mid-position transversely of a cabin front 39.

The cabin front 39 is defined by a front portion of the top frame 23 and the right and left front struts 20 and has an approximately gate-shaped configuration. A gate-shaped partition 40 is mounted in a lower mid-position transversely of the cabin front 39. The partition 40 has right and left lower ends connected to the lower ends of the right and left front struts 20 by connecting members 41 comprising square pipes, respectively.

As shown in FIG. 5, the partition 40 includes a triangular bulge 42, a steering wheel mounting bracket 43, valve holders, wire supports, pedal supports, and so on. The floor sheet 10 has a front portion rising upwardly as at 10B to be connected to the partion 40.

The partition 40 further includes a bonnet connecting portion and a mounting frame 45 for supporting a transparent member or glass plate 44 of the cabin front.

The transparent member 44, together with the mounting frame 45, is fitted in inner peripheries of the cabin front, and more particularly inner peripheries of the top frame and the front struts, by means of a mounting frame 46. Side transparent portions 47 are provided to extend from right and left lower end portions of the transparent member 44.

The transparent member 44 has a curved configuration with a transversely mid-position protruding forwardly, which makes it difficult to form the transparent member 44 integrally with the side transparent portions 47. Thus, the transparent member 44 and the side transparent portions 47 are formed separately and connected to each other by means of transparent adhesive tapes 48, as shown in FIG. 2. The transparent member 44 and the side transparent portions 47 may of course be formed integral with each other.

In the drawings, number 49 denotes a top cover, number 50 denotes a cabin door provided at the hatch of the cabin to be pivotable to open and close, number 51 denotes lateral windows comprising transparent members, number 52 is a rear window comprising a transparent member, number 53 denotes a hand rail, number 54 denotes top cover supports, and number 55 denotes a rear axle case.

Each of the brackets 19 is secured to the rear axle case 55 by means of the bolts 56, and the vibration stopper 15 is secured to the brackets 19 by means of the bolt 17.

The bolts 56 are provided in a forward and rearward pair and, as seen in FIG. 3, bolt-receiving bores for the bolts 56 and the bolt 17 are staggered in the transverse direction. This arrangement permits the same cabin 8 to be mounted on the tractor 1 even when its tread is changed, by turning round the brackets 19.

Furthermore, the bolt-receiving bores for the bolt 17 are arranged at an interval therebetween longitudinally of the tractor, the interval corresponding to a longitudinal dimension of the intermediate case 7. This arrangement permits the same cabin to be mounted on the tractor 1 even when the wheelbase is change.

Figure 9:
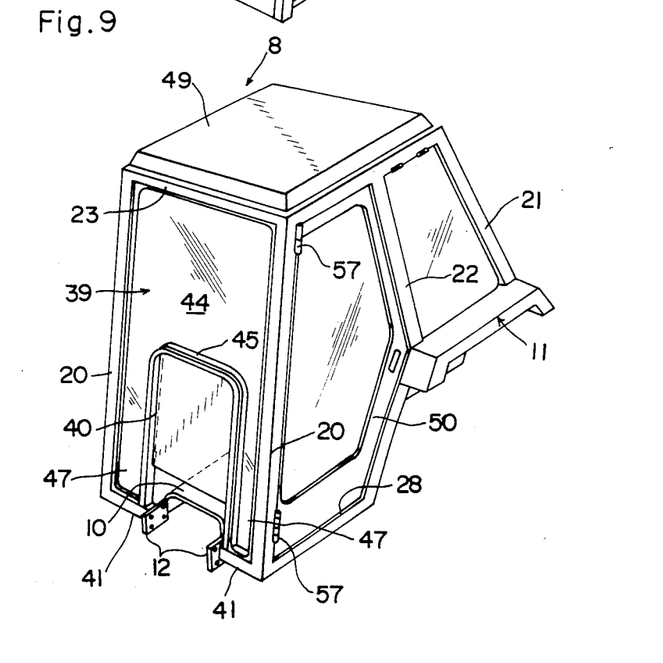
FIG. 9 is a perspective view of another example of cabin.

FIG. 9 shows a modified cabin which differs from the described embodiment in that the mounting seats 12 are attachable to vertical lateral faces of the chassis and that the door is connected at a forward end thereof to the cabin through hinges 57.

Details of the vibration stoppers 14 and 15 will be described hereinafter with reference to FIGS. 10 through 13. The transmission case 5 and the rear axle case 55 are provided with the cabin support brackets 18 and 19, respectively. The cabin 8 is mounted on these brackets 18 and 19 through the vibration stoppers 14 and 15 so as to house the instrument panel 34, the steering wheel 35, the driver's seat 37 and so on, as already described.

Figure 10:
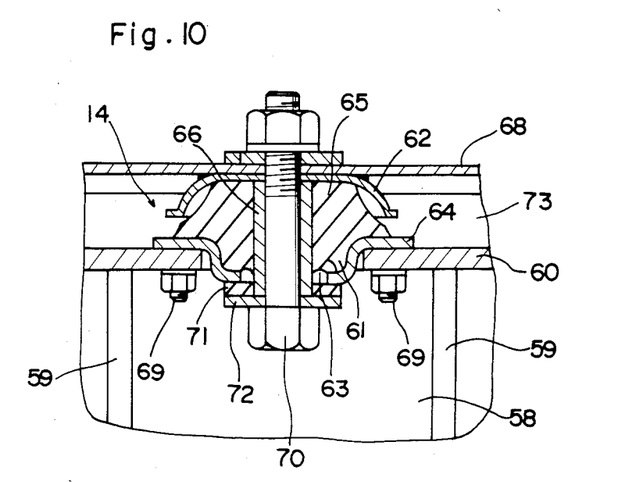
FIG. 10 is a sectional view of a vibration stopper.
Figure 11:
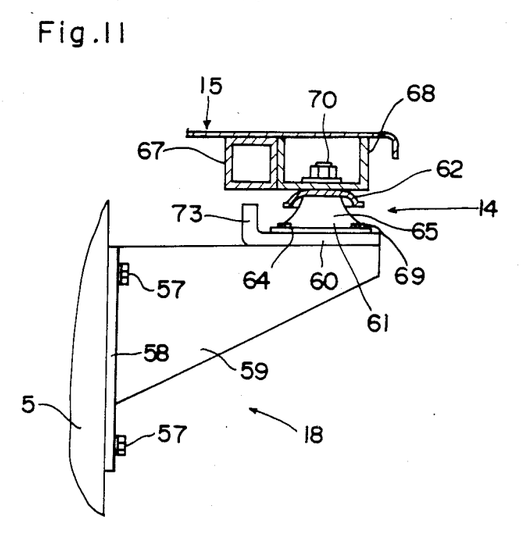
FIG. 11 is a side view partly in section of the vibration stopper.
Figure 12:
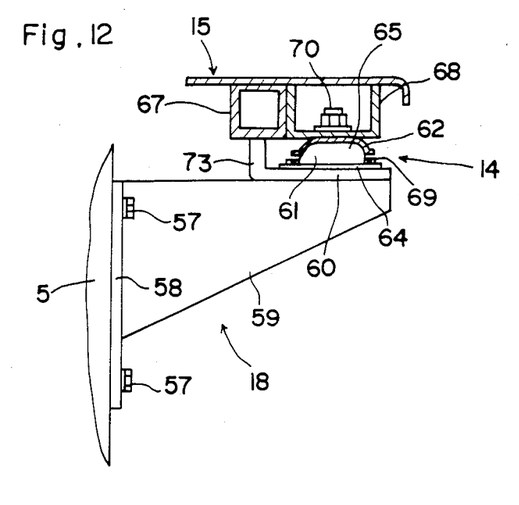
FIG. 12 is a view illustrating an action of the vibration stopper.

Each of the support brackets 18 comprises a stationary plate 58 secured to a lateral wall of the transmission case 5 by bolts 57, a pair of support plates 59 welded to the stationary plate 58 to extend laterally outwardly therefrom and spaced from each other longitudinally of the tractor, and a mounting plate 60 supported by the support plates 59.

Each of the vibration stoppers 14 comprises a vibration absorber assembly 61 secured to the mounting plate 60, and a cover 62 secured to the cabin 8. The vibration absorber assembly 61 includes a stationary support member 64 shaped rectangular in plan view and defining a central recess 63, an elastic member 65 formed of rubber or plastics and securely mounted on the stationary support member 64, and a sleeve collar 66 vertically extending through centers of the elastic member 65 and the stationary support member 64 and fixed to the elastic member 65. A slight space is provided between an outer periphery of the collar 66 and the stationary support member 64.

The cover 62 is bowl-shaped so as to extend over the top of the elastic member 65, and is welded to a bracket member 68 secured to an outer side of a lower frame 67 of the cabin 8. A suitable space is provided between a bottom face of the cover 62 and the stationary support member 64. The elastic member 65 includes a top outer periphery curved inwardly to define a space between the top outer periphery and an inner periphery of the cover 62.

The stationary support member 64 is secured to the top of the mounting plate 60 by bolts 69. The vibration absorber assembly 61 and the cover 62 are secured together by a bolt 70 extending through the sleeve collar 66 and the cover 62. Number 71 denotes a rubber ring, and number 72 denotes a washer.

The mounting plate 60 includes an inner portion bent upwardly to define an upstanding portion 73 having a suitable height. When a great external force acts on the cabin 8 compressing the elastic member 65 to a great degree, a top face of the upstanding portion 73 engages a bottom face of the lower frame 67. When this occurs, there is a slight space left between the bottom face of the cover 62 and the top face of the stationary support member 64. It will be understood that the upstanding portion 73 may be welded to the mounting plate 60.

Figure 13:
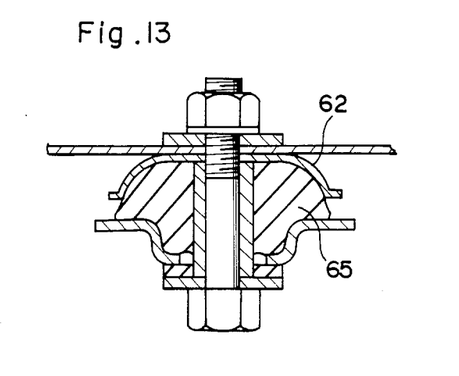
FIG. 13 is a sectional view of a principal portion of the vibration stopper.

Because of the space between the inner periphery of the cover 62 and the outer periphery of the elastic member 65, the elastic member 65 has a soft cushioning effect until the elastic member 65 is compressed into close contact with the entire inner periphery of the cover 62 as shown in FIG. 13. The elastic member 65 in the illustrated compressed state is adapted for further compression by virtue of the space between the bottom face of the cover 62 and the stationary support member 64, thereby to produce a good vibration absorbing effect. Since the cover 62 is effective to limit an excessive laterally outward deformation of the elastic member 65, the elastic member 65 is protected from cracks and other damage and hence an improved durability. The elastic member 65 is further protected from damage resulting from an excessive deformation, by the upstanding portion 73 which contacts the lower frame 67 of the cabin 8 when a great external force acts on the cabin 8 compressing the elastic member 65 to a great degree. Furthermore, since the upstanding portion 73 contacts the lower frame 67 of the cabin 8 at a position inwardly of the tractor with respect to the vibration stopper 14, only a small moment load will act on the bolts 57 securely connecting the stationary plate 58 of the support bracket 18 to the transmission case 5. Therefore, the bolts 57 are safe against breaks or other damage.

Each of the vibration stoppers 15 attached to the rear support brackets 19 also comprises a vibration absorber assembly and a cover.

In the described example the vibration absorber assembly 61 is attached to the chassis 6 and the cover 62 is attached to the cabin 8, but the relationship may be reversed so that the vibration absorber 61 is attached to the cabin 8 and the cover 62 is attached to the chassis 6.

Referring to FIGS. 14 through 17, a power steering mechanism 74 comprises the steering wheel 35, a steering post 75, a mounting member 76, a hydraulic control valve device 77 and an interlocking device 78.

Figure 14:
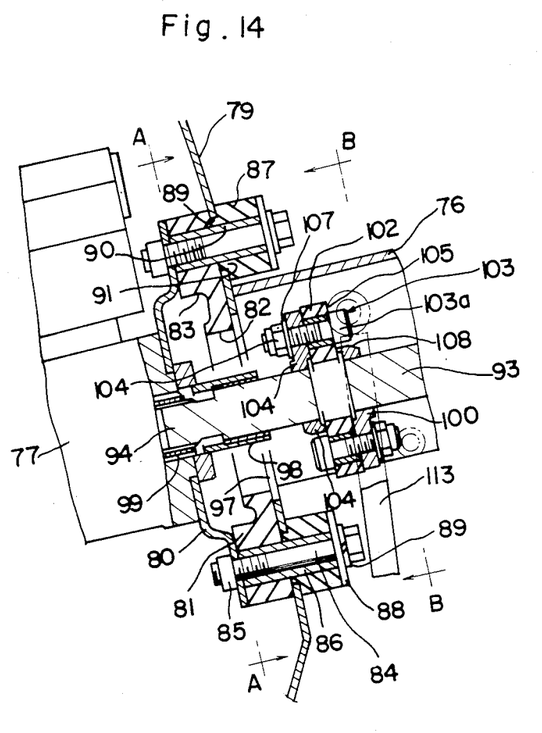
FIG. 14 is a view in vertical section of a principal portion of a power steering mechanism.
Figure 15:
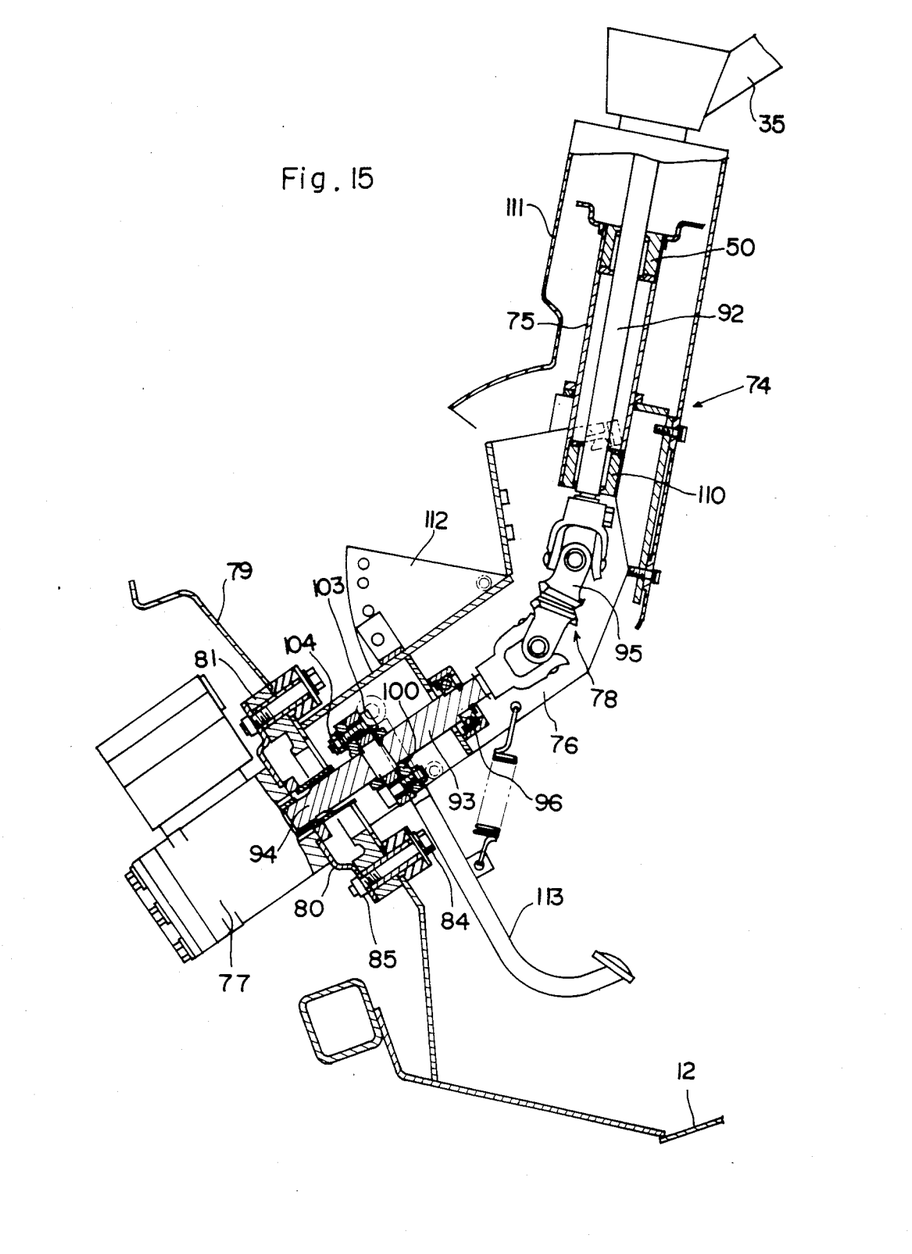
FIG. 15 is a view in vertical section of the power steering mechanism.

The hydraulic control valve device 77 contains a control valve for controlling a power cylinder. As shown in FIGS. 14 and 15, the control valve device 77 is attached to a front face of a partition plate 79 acting as mounting plate such that the control valve device 77 is inclined with a rear end thereof disposed upwardly.

The control valve device 77 is positioned upwardly away from the chassis 6.

The control valve device 77 is provided at the rear end thereof with a rectangular mounting flange 80 defining a circular opening centrally thereof.

Figure 16:
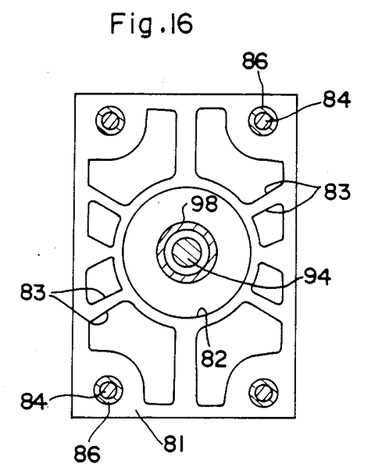
FIG. 16 is a section view taken on line A—A in FIG. 14.

Number 81 denotes an elastic member which, as shown in FIG. 16, is rectangular and defines a circular opening 82 centrally thereof. The elastic member 81 is mounted concentrically between the mounting flange 80 and the partition plate 79. The elastic member 81 has several recesses 83 in a front face thereof to promote its vibration stopping performance.

Numbers 84 and 85 denote a plurality of bolts and nuts arranged peripherally of the mounting flange 80, the elastic member 81 and the partition plate 79. The bolts 84 extends through corners of the mounting flange 80 and the elastic member 81 and through the partition plate 79. A collar 86 is fitted on each of the bolts 84.

Number 87 denotes a cylindrical elastic member fitted on a rear portion of each collar 86 and interposed between a head of the bolt 84 and the partition plate 79. Number 88 denotes a plain washer and number 89 denotes a spring washer.

Each nut 85 is tightened to a forward end of the bolt 84 to cause the elastic members 81 and 87 and the mounting flange 80 to grip the partition plate 79 from opposite sides, whereby the hydraulic control valve device 77 is attached to the partition plate 79.

The elastic members 81 and 87 mounted between the mounting flange 80 and the partition plate 79 and between the heads of the bolts 84 and the partition plate 79 act to mitigate vertical vibrations propagated from the hydraulic control valve device 77 to the partition plate 79.

Each of the elastic members 87 defines a projecting portion 91 at a forward end thereof which projects into a circular collar-receiving opening defined in the partition plate 79. This projecting portion 91 prevents a direct contact between the collar 86 and the partition plate 79, thereby to mitigate vibrations from the hydraulic control valve device 77 acting along the partition plate 79.

The mounting member 76 is disposed rearwardly of the hydraulic control valve device 77 and attached to the partition plate 79 in an included posture with a rear end thereof disposed upwardly. The mounting member 76 has a gate-shaped section.

The interlocking device 78 operatively connects the steering wheel 35 to the hydraulic control valve device 77, and includes a wheel stem 92, a first transmission shaft 93, a second transmission shaft 94, and a universal joint 95.

The first transmission shaft 93 is supported by the mounting member 76 through bearings 96 and operatively connected at a rear end thereof to the wheel stem 92 through the universal joint 95. The second transmission shaft 94 is disposd forwardly of and coaxially with the first transmission shaft 93, and extends through an opening of the partition plate 79, the opening 82 of the elastic member 81 and through the mounting flange 80 to be supported by a support sleeve 98 fixed to the rear end of the hydraulic control valve device 77. The second transmission shaft 94 has a forward end splined to a connecting shaft 99 in the hydraulic control valve device 77.

Figure 17:
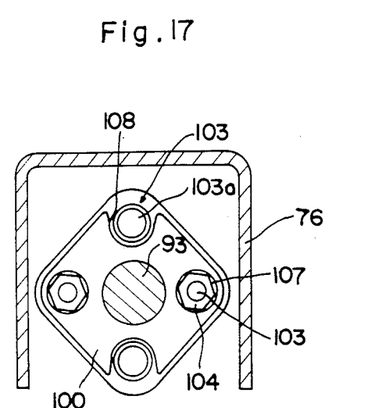
FIG. 17 is a section view taken on line B—B in FIG. 14.

As also shown in FIG. 17, opposed ends of the two tranmission shafts 93 and 94 are fitted with couplers 100 and 101 having an idential construction, respectively.

Number 102 denotes an approximately rectangular elastic member defining a central opening and interposed between the two couplers 100 and 101. Numbers 103 and 104 denotes a plurality of bolts and nuts equidistantly arranged peripherally of the couplers 100 and 101 and the elastic member 102 for interconnecting the couplers 100 and 101.

The bolts 103 are inserted into corners of the elastic member 102 alternately from a front side and from a rear side by means of collars 105 in the axial direction of the shafts 93 and 94. Forward ends of the bolts 103 extend through corners of the couplers 100 and 101, and the nuts 104 are tightened to the forward ends, whereby the couplers 100 and 101 and the elastic member 102 are tightened together in the axial direction of the shafts 93 and 94. Number 107 denotes plain washers.

An opposed pair of cornrs in each of the couplers 100 and 101 are cut out to define receiving pockets 108 and 109 for receiving heads 103a of the bolts 103. When a normal torque is transmitted from the steering wheel 35 to the hydraulic control valve device 77 or when there is no torque transmission, the bolt heads 103a are out of contact with inner faces of the receiving pockets 108 and 109 of the couplers 100 and 101 owing to elasticity of the elastic member 102. At times of rest swing or turning the steering wheel 35 with a hydraulic pressure for the power steering mechanism 74 stopped, a torque exceeding the normal torque is transmitted from the steering wheel 35 to the hydraulic control valve device 77. At such times the bolt heads 103a contact the inner faces of the receiving pockets 108 and 109 in a peripheral direction.

The wheel stem 92 is supported inside the steering post 75 through bearings 110. The wheel stem 92 carries the steering wheel 35 at a top end thereof. The steering post 75 and a holder 111 surrounding the steering post 75 are supported in unison by a rear end of the mounting member 76 through a pivot. The pivot is coaxial with an upper connecting axis of the universal joint 95. Thus, the steering post 75, the wheel stem 92 and the steering wheel 35 are tiltable in the fore and aft direction and lockable to a desired position by a locking device 112. Number 113 denotes a brake pedal.

With the described construction, the elastic member 102 is interposed between the two couplers 100 and 101 and the heads 103a of the bolts 103 are out of contact with the inner faces of the receiving pockets 108 and 109 of the couplers 100 and 101 when the steering wheel 35 is at rest. Therefore, microvibrations and beats caused by movement of pressure oil in the hydraulic control valve device 77 are effectively absorbed by the elastic member 102 whereby the microvibrations and beats are mitigated prior to transmission to the steering wheel.

When the normal torque is transmitted from the steering wheel 35 to the hydraulic control valve device 77, a turn of the steering wheel 35 causes a rotation of the connecting shaft 99 through the wheel stem 92, the universal joint 95, the first transmission shaft 93, the two couplers 100 and 101, the bolts 103, the elastic member 102 and the second transmission shaft 99, whereby the hydraulic control valve device 77 is controlled. Then the front wheels are steered by means of the power cylinder.

In the above situation too, the bolt heads 103a are out of contact with the inner faces of the receiving pockets 108 and 109 owing to the elasticity of the elastic member 102, which results in mitigation of the microvibrations and beats transmitted to the steering wheel 35. Thus, in the normal torque situation the microvibrations and beats transmitted to the steering wheel 35 are mitigated.

When a torque exceeding the normal torque is transmitted from the steering wheel 35 to the hydraulic valve control device 77 as at times of rest swing or turning the steering wheel 35 with the hydraulic pressure for the power steering mechanism 74 stopped, a turn of the steering wheel 35 causes the coupler 100 secured to the first transmission shaft 93 and a pair of bolts 103 fixed to the coupler 100 to rotate relative to the elastic member 102, whereby the heads 103a of the bolts 103 contact the inner faces of the receiving pockets 108 and 109 of the couplers 100 and 101 in the peripheral direction.

As a result, the two couplers 100 and 101 rotate in unison by means of the bolts 103 and not by means of the elastic member 102. Thus a torque exceeding the normal torque is transmitted from the steering wheel 35 to the hydraulic control valve device 77 in a reliable manner, and the elastic member 102 is positively protected from damage.

Figure 18:
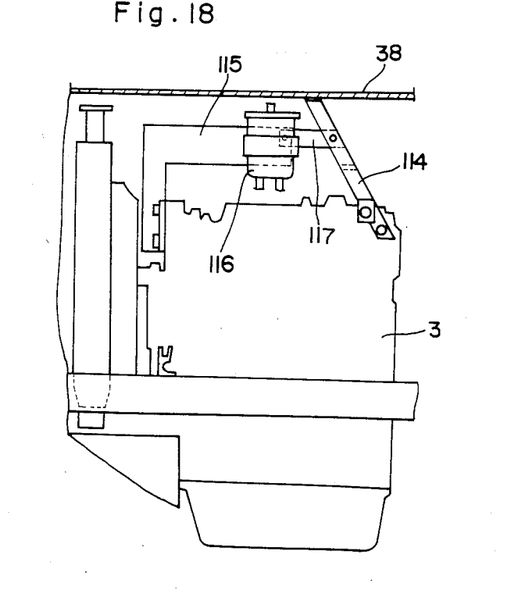
FIG. 18 is a view in vertical section of a bonnet interior.

Referring to FIG. 18 showing an interior of the bonnet 38, the engine 3 carries a forwardly inclined support member 114 fixed to a rear portion thereof for supporting the bonnet 38. Further, an L-shaped tank supporting base 115 extends upwardly from a front face of the engine 3 and rearwardly over the engine 3, and supports an oil tank 116 for storing oil for the power steering mechanism. Number 117 denotes a connecting member connecting the support member 114 to a rear end of the tank supporting base 115.

What is claimed is:

1. A tractor cabin having a pair of right and left front struts, a pair of right and left rear struts, a pair of right and left intermediate struts disposed between the front are rear struts, a top frame interconnecting upper ends of the front, rear and intermediate struts, a floor sheet attached to lower ends of the front, rear and intermediate struts and a gate-shaped cabin front defined by the front struts and the top frame, said cabin comprising a gate-shaped partition assembly (40) disposed at a lower mid-position transversely of the cabin front (39) and being connected to a forward end of the floor sheet (10), said gate-shaped partition assembly (40) having a mounting frame (45), a steering wheel mounting bracket (43), a triangular bulge (42), valve supports, wire supports and pedal supports, connecting members (41) connecting right and left lower ends of the partition assembly (40) to lower ends of the right and left front struts (20), and a transparent member (44) secured to inner peripheries of the cabin front (39) and supported by the mounting frame (45), the transparent member including side transparent portions (47) extending downwardly therefrom.

2. A tractor cabin as claimed in claim 1 wherein the partition assembly (40) includes a bonnet connecting portion.

3. A tractor cabin having a pair of right and left front struts, a pair of right and left rear struts, a pair of right and left intermediate struts disposed between the front and rear struts, a top frame interconnecting upper ends of the front, rear and intermediate struts, a floor sheet attached to lower ends of the front, rear and intermediate struts, and a gate-shaped cabin front defined by the front struts and the top frame, said cabin comprising a gate-shaped partition assembly (40) disposed at a lower mid-position transversely of the cabin front (39) and being connected to a forward end of the floor sheet (10), said gate-shaped partition assembly (40) having a mounting frame (45), a steering wheel mounting bracket (43) and means for supporting peripheral devices, connecting members (41) connecting right and left lower ends of the partition assembly (40) to lower ends of the right and left front struts (20), and a transparent member (44) secured to inner peripheries of the cabin front (39) and supported by the mounting frame (45), the transparent member including side transparent portions (47) extending downwardly therefrom.

4. In combination, a tractor cabin according to claim 3 in which the partition assembly (40) further comprises a partition plate (79), a steering mechanism including a hydraulic control valve device (77), and a vibration-absorbing structure for attaching the steering mechanism to the partition plate (79), said vibration-absorbing structure comprising a mounting flange (80) connected to the valve device (77), an elastic member (81) having an opening (82) and situated between the mounting flange (80) and the partition plate (79), an elastic member (87) having an opening and situated adjacent to the partition plate (79), and a plurality of tightening means passing through the mounting flange (80), the partition plate (79) and the elastic members (81) (87) so that the valve device (77) can be securely attached to the partition plate (79) by means of the elastic members (81) (87).

5. In the combination as claimed in claim 4, wherein said steering mechanism further includes an interlocking device (78) having a wheel stem (92) connected to a steering wheel (35), a universal joint (95) connected to the wheel stem (92), a first transmission shaft (93) connected to the universal joint (95), and a second transmission shaft (94) situated between the valve device (77) and the shaft (93), said shaft (94) passing through the openings of the elastic members (81) (87).

6. In combination as claimed in claim 5, wherein said interlocking device (78) further includes a coupler (100) connected to the shaft (93), a coupler (101) connected to the shaft (94), an elastic member (102) situated between the couplers (100) (101), and a plurality of connecting means extending through the couplers (100) (101) and the elastic member (102).

* * * * *